J. E. PIERCE.
COTTON PICKER.
APPLICATION FILED MAR. 21, 1908.

918,902.

Patented Apr. 20, 1909.
4 SHEETS—SHEET 1.

J. E. PIERCE.
COTTON PICKER.
APPLICATION FILED MAR. 21, 1908.

918,902.

Patented Apr. 20, 1909.
4 SHEETS—SHEET 3.

Witnesses

Inventor
J. E. Pierce.
By
Attorneys

J. E. PIERCE.
COTTON PICKER.
APPLICATION FILED MAR. 21, 1908.
918,902.
Patented Apr. 20, 1909.
4 SHEETS—SHEET 4.
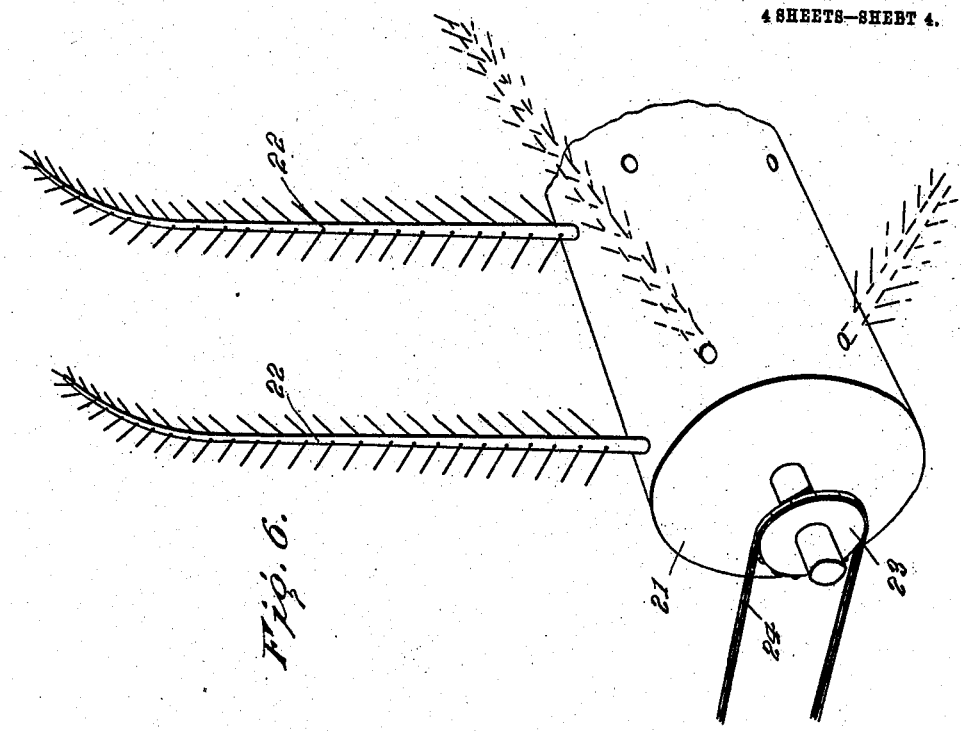
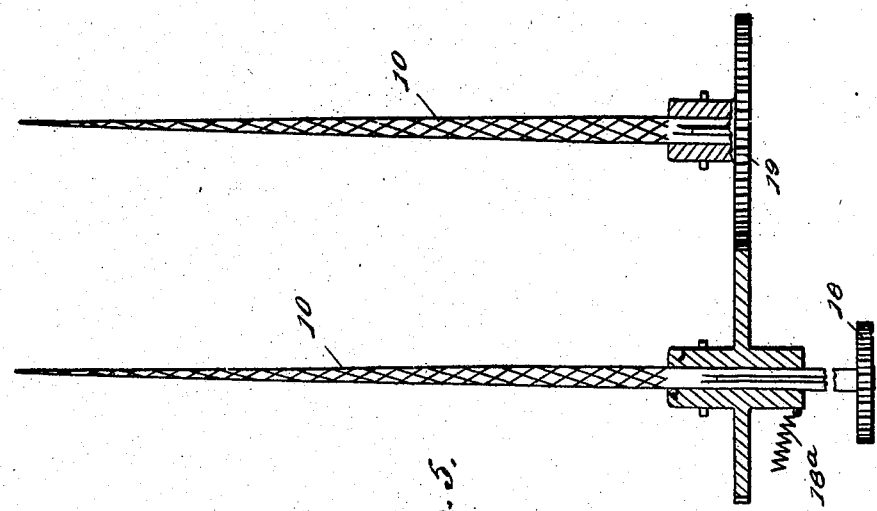
Witnesses
Inventor
J. E. Pierce.
By
Attorneys

UNITED STATES PATENT OFFICE.

JOHN EARL PIERCE, OF BENJAMIN, TEXAS.

COTTON-PICKER.

No. 918,902.  Specification of Letters Patent.  Patented April 20, 1909.

Application filed March 21, 1908. Serial No. 422,569.

*To all whom it may concern:*

Be it known that I, JOHN EARL PIERCE, citizen of the United States, residing at Benjamin, in the county of Knox and State of Texas, have invented certain new and useful Improvements in Cotton-Pickers, of which the following is a specification.

The present invention appertains to machinery for harvesting cotton and which is of such construction as to prevent injury to the plants or the uprooting thereof and which will not gather trash or affect green bolls.

In its structural organization, the machine embodies a plurality of spindles which are bearded or roughened so as to engage with the cotton and remove the same from the bolls, said spindles being mounted upon a rotary support whose axis has a horizontal arrangement and said spindles being mounted to receive an alternate rotary movement about their own axes, being driven in one direction when gathering the cotton and rotated in the opposite direction to loosen the cotton to facilitate its removal.

For a full understanding of the invention and the merits thereof and also to acquire a knowledge of the details of construction and the means for effecting the result, reference is to be had to the following description and accompanying drawings.

Figure 1:
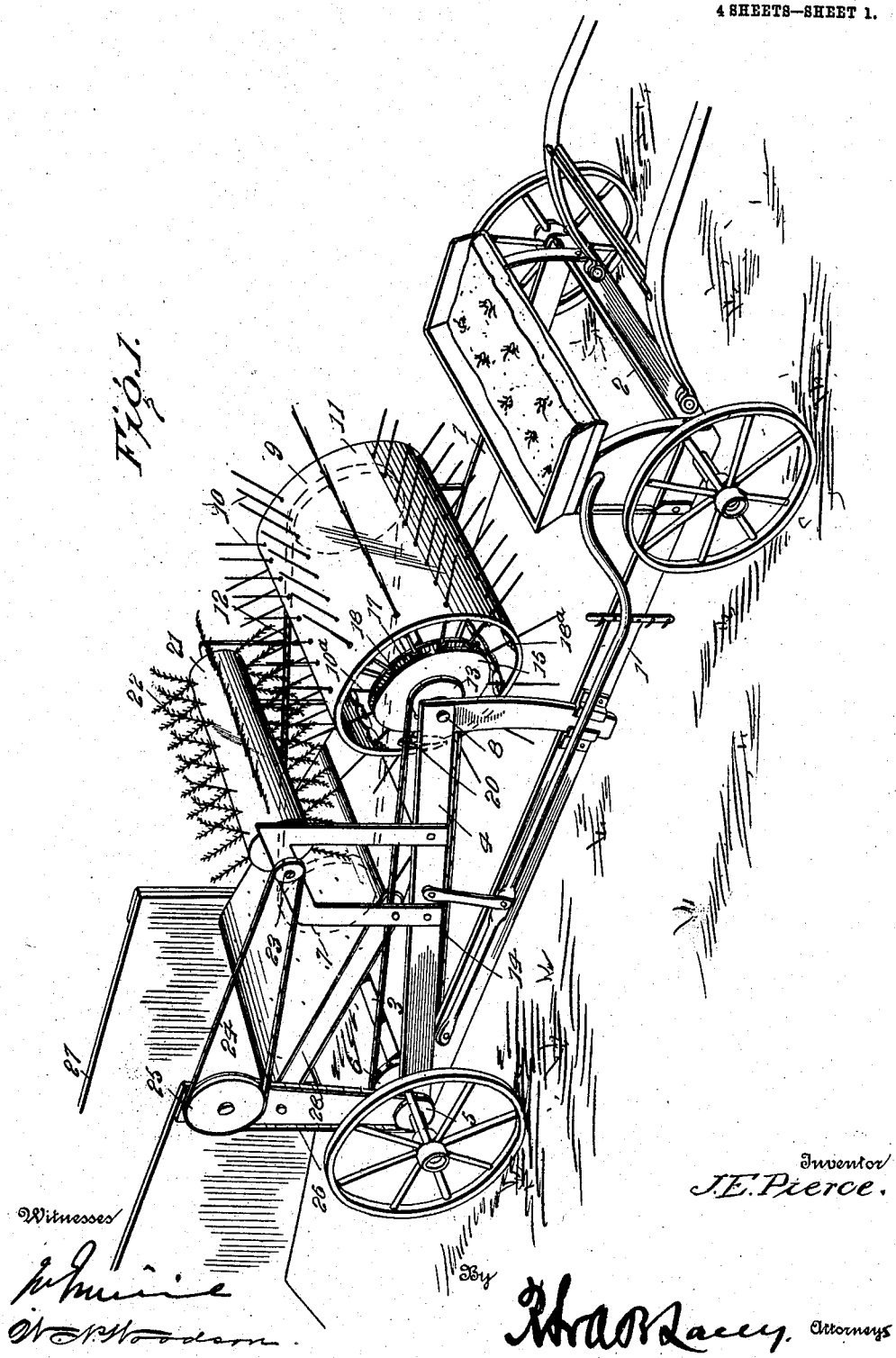
Figure 2:
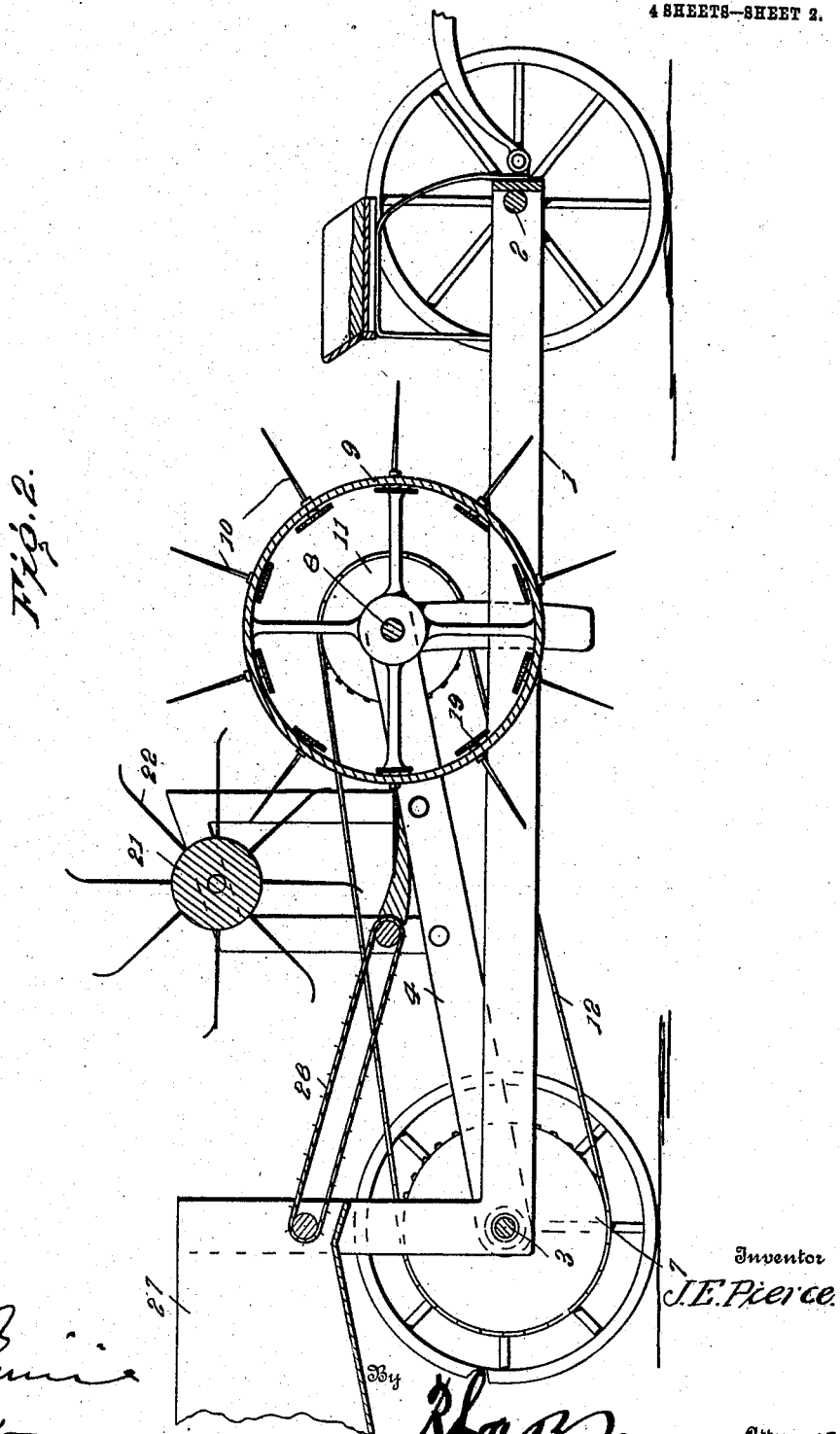
Figure 3:
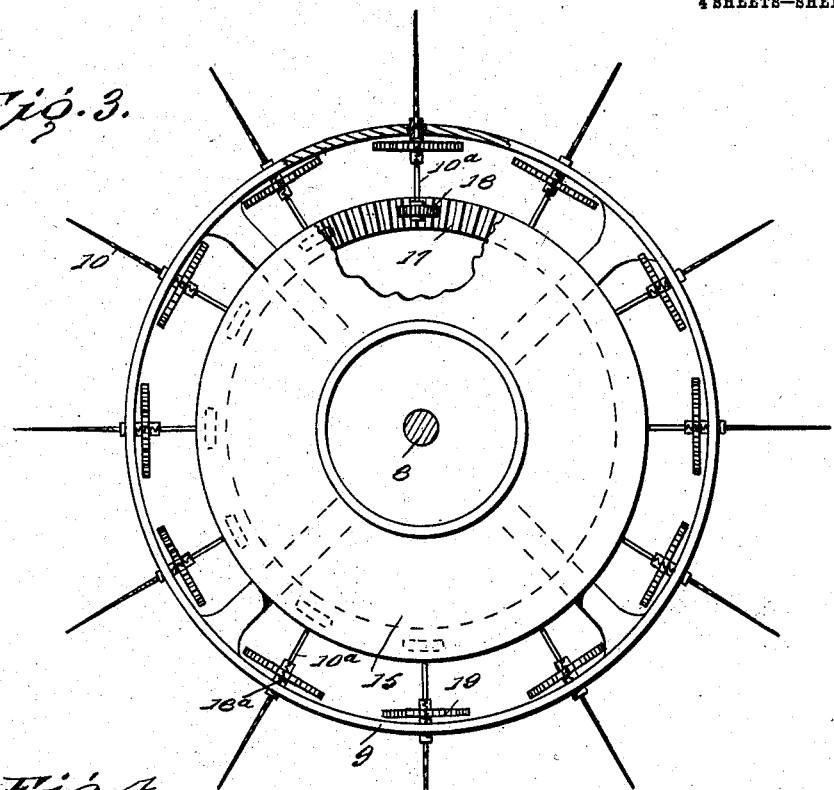
Figure 4:
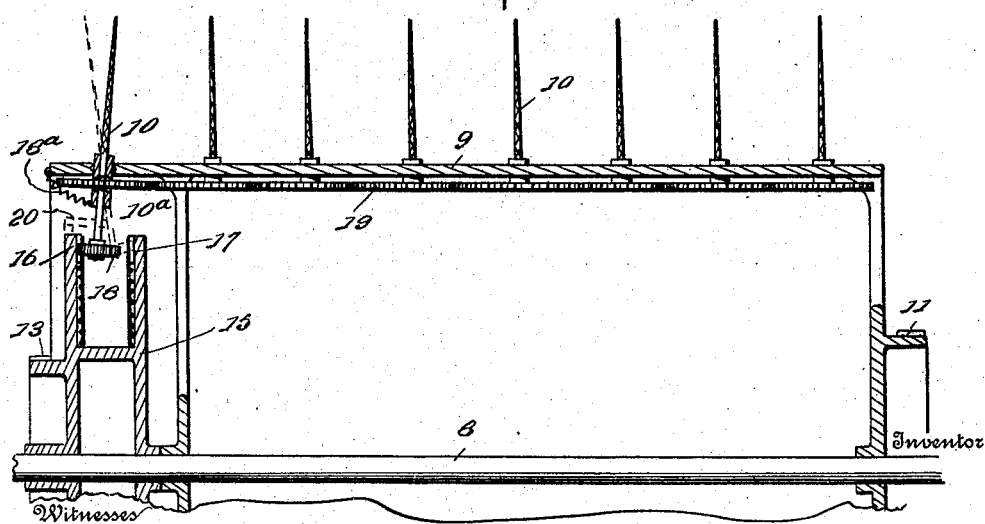

While the invention may be adapted to different forms and conditions by changes in the structure and minor details without departing from the spirit or essential features thereof, still the preferred embodiment is shown in the accompanying drawings, in which:

Figure 1 is a perspective view of a cotton picker embodying the invention. Fig. 2 is a vertical central longitudinal section of the machine. Fig. 3 is an end view of the rotary support or picker drum, a portion being broken away. Fig. 4 is a longitudinal section of the upper portion of the rotary support or picker drum. Fig. 5 is a detail view of two spindles, showing the same on a larger scale. Fig. 6 is a detail perspective view of an end portion of the clearer or brush for removing the cotton from the spindles.

Corresponding and like parts are referred to in the following description and indicated in all the views of the drawings by the same reference characters.

The operating mechanism is mounted upon a truck or running gear, the same consisting of a frame 1 and front and rear axles 2 and 3, said axles being provided with supporting wheels in the usual manner, the rear wheels being utilized also as drivers for running the operating parts. A supplemental frame 4 is mounted upon the frame 1 so as to be adjusted vertically to regulate the height of the picking or harvesting mechanism, as may be required to secure the best results. A series of gear wheels 5, 6 and 7 may be mounted upon the rear axle 3 or have connection with the rear wheels so as to receive motion from the latter. The picker or harvester mechanism consists of a shaft 8, drum 9 mounted upon said shaft and a series of spindles 10, the latter being provided in longitudinal and circumferential rows on said drum. The part 9 constitutes a rotary support for the pickers or spindles 10. The shaft 8 and drum 9 are rotated at different speeds, the speed of the drum 9 being less than the movement of the machine, whereby the spindles in contact with the plants are caused to track with the result that the cotton is thoroughly removed from the plants and but little, if any, left in the field. A gear wheel 11 fast to an end portion of the drum or rotary support 9 is connected by sprocket chain 12 with the sprocket wheel 7. A gear wheel 13 either loose upon or fast to the shaft 8 is connected by sprocket chain 14 with the sprocket wheel 6. A driver 15 mounted upon the shaft 8 and having the gear wheel 13 fast thereto, is provided with two sets of cog gearing 16 and 17 which are transversely spaced and receive between them pinions 18 fast to the inner ends of the series of spindles 10 at one end of the drum or rotary support. The terminal or end spindles are indicated at 10$^a$ and are mounted in the drum or rotary support so as to receive an oscillatory movement, whereby the pinions 18 may be thrown into gear with either set of cog gearing 16 or 17. A spring 18$^a$ coöperates with each spindle 10$^a$ to normally hold the pinion 18 in mesh with the cog gearing 16. Gear wheels 19 are fast to the inner ends of the spindles and are in meshing relation, hence when the machine is in operation, the spindles of a row are alternately rotated in opposite directions. The spindles are slender and are tapered throughout their length and are bearded or roughened on their outer surfaces so as to make positive engagement with the cotton and draw the same from the bolls as the machine is moved over the plants. A trip 20 is arranged in the path of the spindles 10ᵃ to disengage the pinions 18 from the cog gearing 16 and cause them to mesh with the cog gearing 17, whereby the spindles are rotated in the opposite direction. This takes place at or about the instant a longitudinal row of spindles comes in position to be acted upon by the brush or clearer, with the result that the cotton is loosened from the spindles and is quickly and easily removed therefrom by the clearer or brush.

The brush or clearer comprises a body 21 and a series of tufts 22 projected outward therefrom in longitudinal and circumferential rows, the outer ends of the tufts being rearwardly curved with reference to the direction of rotation of the brush or clearer. The tufts or brush elements are arranged to operate on opposite sides of the spindles so as to engage with the cotton at opposite points and thereby insure its ready removal from the spindles. The brush or clearer is driven at a comparatively high speed to cause the brush elements to quickly strip the cotton from the spindles. A sprocket wheel 23 fast to the projecting end of the shaft of the rotary brush or clearer is connected by means of sprocket chain 24 to a sprocket idler 25, which latter in turn is connected by means of a sprocket chain 26 to the sprocket wheel 5. The rotary brush or clearer is arranged above and in the rear of the picking mechanism so as to strip the cotton from the spindles as soon as the latter leave the plant and before the spindles assume an upright position.

A wagon or receptacle 27 is arranged in the rear of the machine to receive the cotton, the latter being delivered thereto by means of an elevator 28, which inclines upwardly and rearwardly from a point beneath the rotary brush or clearer. The elevator 28 may be of any construction and arrangement and is driven so that its upper portion travels upward and rearward, thereby effecting delivery of the cotton to the wagon or receptacle 27.

In the operation of the machine the same is drawn over the field so that the rotary support or drum 9 is caused to travel over a row of plants with the spindles operating between the branches to within a short distance of the ground, the parts being adjusted to insure thorough action of the spindles upon every portion of the plant bearing cotton. Because of the comparatively slow rotary movement of the picker drum, the spindles remain in active relation with the plants for a longer period than would be the case if the drum were rotated at a compara- tively high speed, hence the cotton is thoroughly removed from the plants. When the spindles are operating upon the plants to gather or pick the cotton, they are rotated in one direction and when they clear the plants and come in position to be acted upon by the rotary brush or clearer, the spindles are rotated in an opposite direction, with the result that the cotton is loosened, and at the same time is stripped from the spindles by the action of the brush. All cotton not delivered directly into the wagon or receptacle 27 by the action of the brush, and falling upon the elevator 28, is delivered thereby into said receptacle or wagon.

Having thus described the invention, what is claimed as new is:

1. In a cotton harvester, the combination of a rotary support, a series of spindles mounted thereon, a driver comprising toothed portions spaced apart, certain of the spindles extending into the space formed between the toothed portions of the driver, pinions mounted upon the extensions of the spindles and adapted to mesh with either toothed portion of the driver, and means for throwing either toothed portion of the driver into mesh with the said pinions, whereby the spindles may be rotated in opposite directions.

2. In a cotton harvester, the combination of a rotary support, a series of spindles mounted thereon, certain spindles having extensions and mounted to oscillate, pinions mounted upon the extensions of the oscillating spindles, a driver comprising toothed portions spaced apart adapted to receive between the said toothed portions the aforesaid pinions, and means for imparting movement to the oscillatory spindles to throw the pinions thereof into gear with either toothed portion of the said driver.

3. In a cotton harvester, the combination of a drum, rows of spindles mounted in the drum, gearing connecting the spindles of the several rows, one of the spindles of each row being extended, pinions mounted upon the extended spindles, a driver comprising spaced toothed portions adapted to receive between them the aforesaid pinions, and means for throwing said pinions into mesh with either set of cog gearing of the driver to impart rotary movement to the spindles in either direction.

In testimony whereof I affix my signature in presence of two witnesses.

JOHN EARL PIERCE. [L. S.]

Witnesses:
 A. H. SAMS,
 C. H. BURNETT.